United States Patent
Burtch (10) Patent No.: US 10,167,561 B2
(45) Date of Patent: Jan. 1, 2019

(54) METHOD AND APPARATUS FOR PRODUCING HYDROGEN HAVING REVERSIBLE ELECTRODES

(71) Applicant: John Christopher Burtch, Scarborough (CA)

(72) Inventor: John Christopher Burtch, Scarborough (CA)

(73) Assignee: John Christopher Burtch, Scarborough (CA)

( * ) Notice: Subject to any disclaimer, the term of this patent is extended or adjusted under 35 U.S.C. 154(b) by 244 days.

(21) Appl. No.: 15/379,964

(22) Filed: Dec. 15, 2016

(65) Prior Publication Data

US 2018/0171488 A1 Jun. 21, 2018

(51) Int. Cl.
 C25B 1/04 (2006.01)
 C25B 11/04 (2006.01)
 C25B 15/02 (2006.01)

(52) U.S. Cl.
 CPC ............ C25B 1/04 (2013.01); C25B 11/0405 (2013.01); C25B 11/0447 (2013.01); C25B 15/02 (2013.01)

(58) Field of Classification Search
 CPC ............ C25B 1/02–1/08; C25B 15/02; C25B 11/0405; C25B 11/0447
 See application file for complete search history.

(56) References Cited

U.S. PATENT DOCUMENTS

| | | | | |
|---|---|---|---|---|
| 4,778,572 A | * | 10/1988 | Brown | C25D 17/00 205/100 |
| 5,089,107 A | | 2/1992 | Pacheo | |
| 7,948,101 B2 | | 5/2011 | Burtch | |
| 8,282,812 B2 | | 10/2012 | Burtch | |
| 8,440,146 B2 | | 5/2013 | Griffin | |
| 2008/0190781 A1 | * | 8/2008 | Huang | C01B 3/0026 205/639 |
| 2012/0121998 A1 | * | 5/2012 | Bienvenu | C25B 5/00 429/422 |

* cited by examiner

Primary Examiner — Nicholas A Smith
(74) Attorney, Agent, or Firm — Bereskin & Parr LLP; Timothy J. Sinnott (57) ABSTRACT

Provided is a method and an apparatus for producing hydrogen from salt water by electrolysis. The apparatus includes at least one pair of electrodes, wherein the pair of electrodes comprises a first zinc plated electrode and a second zinc plated electrode spaced apart from the first zinc plated electrode, a controller for supplying direct electrical current across the first and second electrodes such that the first and second electrodes are oppositely charged, and a tank containing an electrolytic solution including salt water and a mild acid. The first and second electrodes are immersed in the electrolytic solution.

25 Claims, 6 Drawing Sheets

METHOD AND APPARATUS FOR PRODUCING HYDROGEN HAVING REVERSIBLE ELECTRODES

TECHNICAL FIELD

The embodiments disclosed herein relate to methods and apparatus for producing hydrogen, and, in particular to method and apparatus for producing hydrogen from salt water by electrolysis.

INTRODUCTION

Electrolysis is a known method of producing hydrogen gas from water, in which two electrodes are placed in water and an electrical power supply is connected to the electrodes. The positively charged electrode is called the anode and the negatively charged electrode is the called the cathode. When performing fresh water electrolysis, water decomposes into hydrogen gas and oxygen gas. Hydrogen tends to form at the cathode and oxygen tends to form at the anode.

One problem with the fresh water electrolysis is that fresh water has poor electrical conductivity, which prevents the flow of electrons from the electrical power supply, through the cathode, and to the anode. Without the flow of free electrons, the electrochemical reactions cannot occur, and water will not decompose into hydrogen and oxygen. For this reason, an electrolyte such as salt (e.g. sodium chloride) is added to the water so as to provide ions, which tends to increase the conductivity of water and improve the efficiency of electrolysis.

While salt water electrolysis is more efficient than fresh water electrolysis, salt water electrolysis is still a relatively inefficient process for producing hydrogen. As a result, salt water electrolysis represents only a small fraction of the total hydrogen production worldwide.

Increasing the efficiency of salt water electrolysis could substantially increase the amount of hydrogen produced worldwide. In particular, oceans are an abundant source of salt water and could be utilized to extract large amounts of hydrogen for use in commercial and industrial applications. However, this is not practical until salt water electrolysis becomes more efficient.

U.S. Pat. No. 8,282,812, to the same inventor, is directed to methods and apparatus for producing hydrogen from salt water by electrolysis, which use a solid zinc anode and an aluminum cathode. The zinc electrode deteriorates and is replaced, while the zinc oxide, being produced, is continually removed. Zinc is consumed during the process and zinc oxide is produced as well as hydrogen. This necessitates the replacement of the zinc plates and the removal of the zinc oxide.

Accordingly, there is a need for new or improved apparatus and methods for producing hydrogen from salt water by electrolysis.

SUMMARY

According to some embodiments, there is an apparatus for producing hydrogen from salt water by electrolysis. The apparatus comprises at least one pair of electrodes, wherein the pair of electrodes comprises a first zinc plated electrode and a second zinc plated electrode spaced apart from the first zinc plated electrode, a controller for supplying direct electrical current across the first and second electrodes such that the first and second electrodes are oppositely charged, and a tank containing an electrolytic solution including salt water and a mild acid. The first and second electrodes are immersed in the electrolytic solution.

The controller may include a switch for reversing the direction of electrical current flow supplied across the first and second electrodes such that the first electrode switches from being an anode to being a cathode and the second electrode switches from being a cathode to being an anode.

The first electrode and the second electrode may each comprise an aluminum plate.

The second electrode may be thinly plated with zinc such that the aluminum plate does not oxidize in the electrolytic solution.

The thin plating of zinc may be about $1/16$ of the thickness of the aluminum plate of the second electrode.

The first electrode may be thickly plated with zinc such that the thickness of the zinc plating is dependent on a desired run time.

The plating time may be about three times the desired run time.

The thick plating of the zinc may be about $1/4$ of the thickness of the aluminum plate of the first electrode.

The mild acid may be vinegar.

The electrolytic solution may be seeded with zinc.

The first and second electrodes may include any one of aluminum alloy, copper, or steel.

The apparatus may further comprise a collector positioned to collect hydrogen from the first electrode or oxygen from the second electrode, dependent on the direction of the electrical current.

The collector may include flap valves for selectively collecting hydrogen or oxygen.

The collector may include a pivot that pivots based on the direction of the electrical current to direct hydrogen or oxygen upwards towards the open flap valve.

The controller may include a regulator for regulating the amount of electrical voltage and current supplied across the first and second electrodes.

The controller may include a sensor for monitoring the electrical current. The regulator may regulate the electrical current based on the sensed electrical current.

The controller may reverse the direction of the electrical current flow after the desired run time.

Each pair of electrodes may comprise one thickly zinc coated anode and one thinly zinc coated cathode.

According to some embodiments, there is a method of producing hydrogen from salt water by electrolysis. The method comprises immersing at least one pair of electrodes in an electrolytic solution including salt water and a mild acid, wherein the pair of electrodes comprises a first zinc plated electrode and a second zinc plated electrode spaced apart from the first zinc plated electrode, supplying direct electrical current across the first and second electrodes such that the first and second electrodes are oppositely charged, collecting the hydrogen gas produced at the second electrode, collecting the oxygen gas produced at the first electrode, and reversing the direction of the electrical current supplied across the first and second electrodes.

The method may further comprise thickly plating the first electrode with zinc such that the thickness of the zinc plating is dependent on a desired run time.

The method may further comprise thinly plated the second electrode with zinc such the thin plating of zinc is about $1/16$ of the thickness of the second electrode.

The method may further comprise seeding the electrolytic solution with zinc.

The method may further comprise regulating the amount of electrical voltage and current supplied across the first and second electrodes.

The method may further comprise sensing the electrical current, and wherein regulating the electrical current based on the sensed electrical current.

The method may further comprise reversing the direction of the electrical current supplied across the first and second electrodes after the desired run time, wherein the run time is based on the amount of zinc plated on the first electrode.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Figure 1:
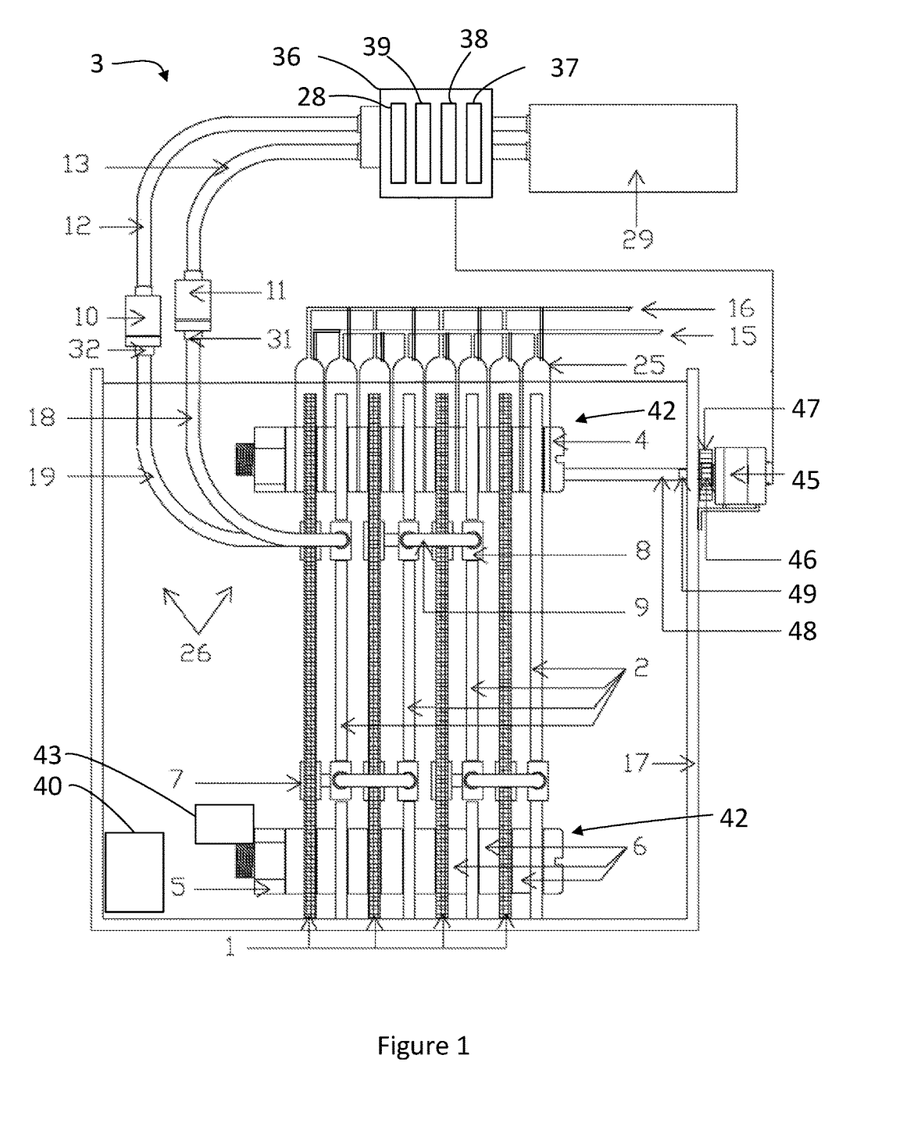
FIG. 1 is a section view of an apparatus for producing hydrogen, in accordance with an embodiment.

Referring to FIG. 1, illustrated therein is an apparatus 3 for producing hydrogen and oxygen from salt water, in accordance with an embodiment. The apparatus 3 includes at least one pair of electrodes. Each pair of electrodes includes a first electrode 1 and a second electrode 2 that are oppositely charged and arranged in a stack. The first and second electrodes 1, 2 are separated apart from each other and immersed in a tank 17 containing an electrolytic solution 26. As shown, the apparatus 3 includes four pairs of electrodes 1, 2. The first electrode 1 and the second electrode 2 are connected to a power supply 29 and controller 36 so as to be oppositely charged to produce hydrogen and oxygen gasses.

As shown, the first electrode 1 may be an anode that is a positively charged electrode that attracts electrons or negatively charged atoms. The second electrode 2 may be a cathode that is a negatively charged electrode that attracts protons or positively charged atoms. The apparatus 3 produces hydrogen and oxygen from salt water in the electrolytic solution 26 by electrolysis and the oxidization of zinc.

Figure 2:
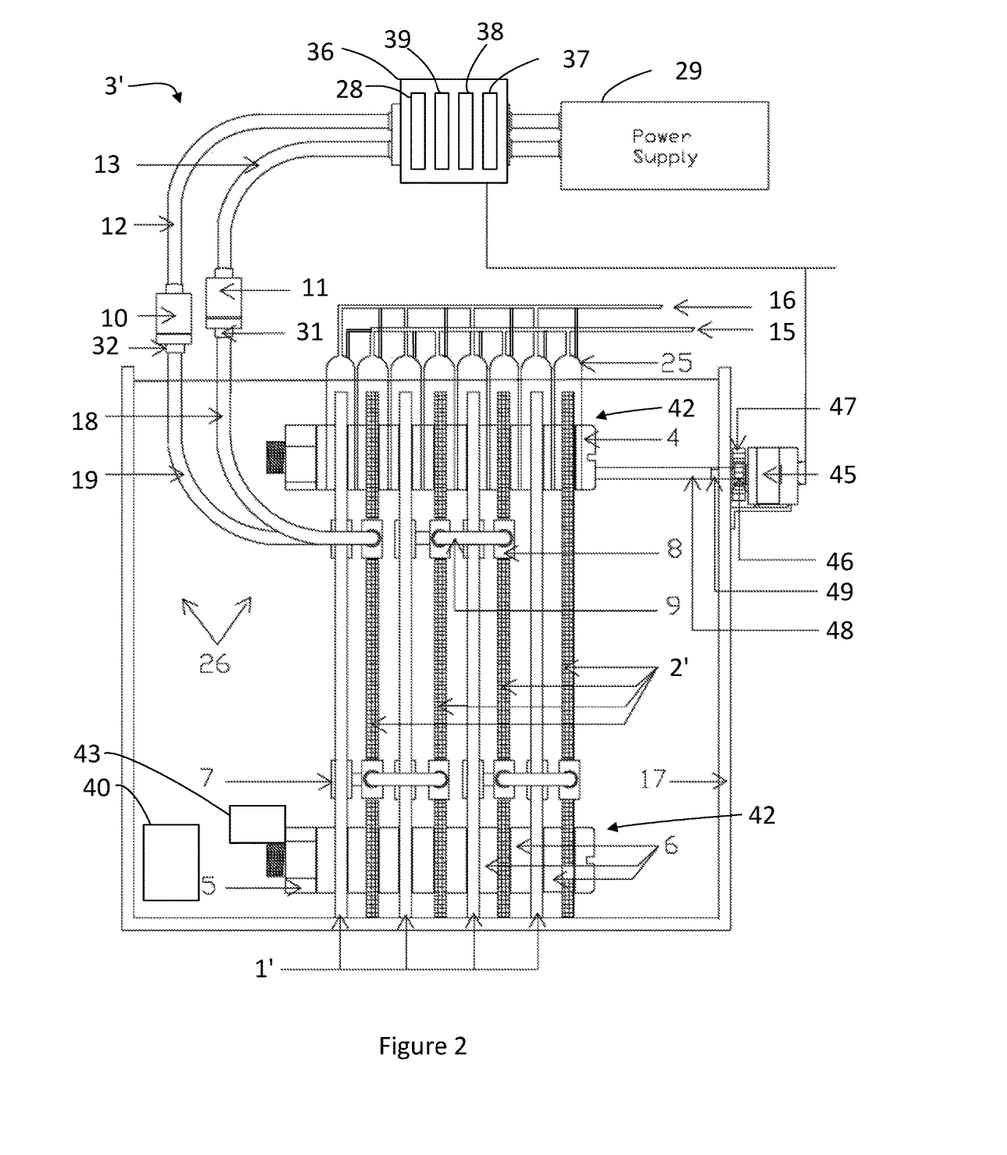
FIG. 2 is a section view of the apparatus of FIG. 1 in a second position.
Figure 3:
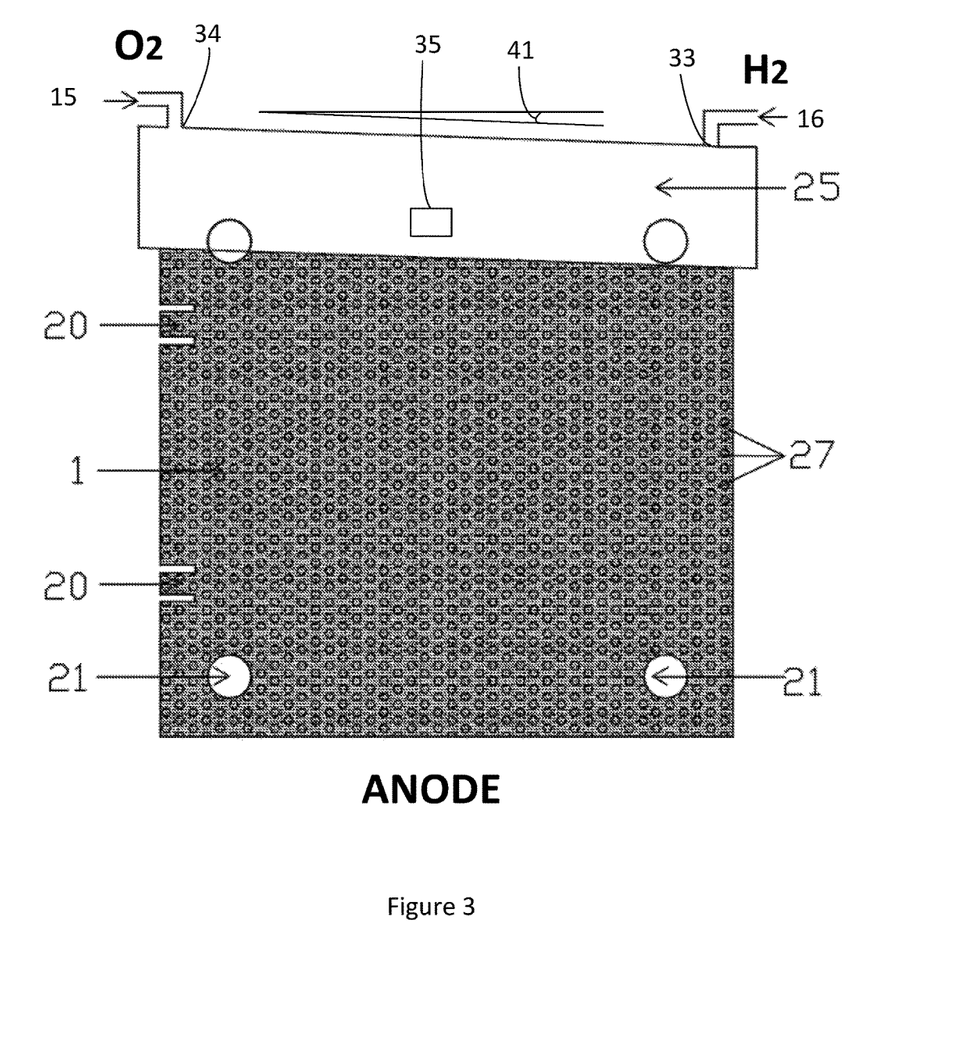
FIG. 3 is a side view of a cathode of the apparatus of FIG. 1.
Figure 4:
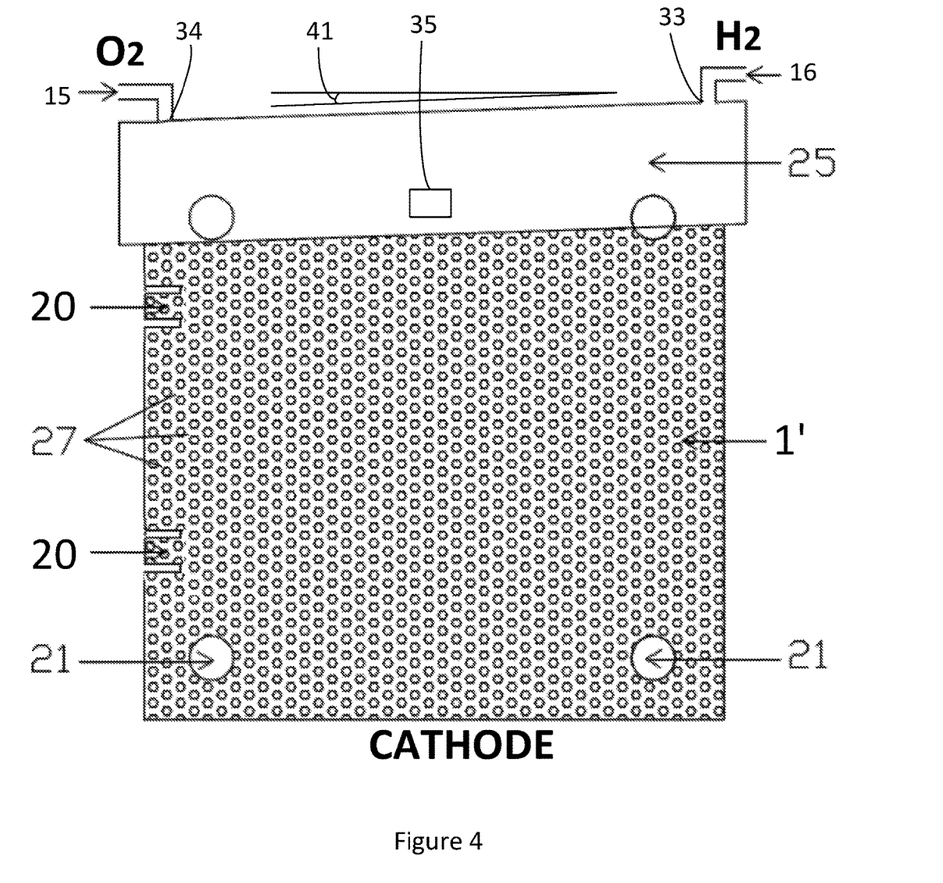
FIG. 4 is a side view of an anode of the apparatus of FIG. 1.

Each of the first electrodes 1 are switched between operating as an anode (FIGS. 1 and 3) and a cathode (FIGS. 2 and 4). Each of the second electrodes 2 are correspondingly switched between operating as a cathode (FIG. 1), and an anode (FIG. 2).

The electrodes 1, 2 are metal plates plated with zinc. In an embodiment, the zinc plating is a zinc oxide, or the like. In particular, the first electrode 1 is made of an aluminum plate and is initially heavily coated in zinc while acting as the anode. The second electrode 2 is also made of an aluminum plate and is initially thinly coated in zinc while acting as the cathode.

The electrolytic solution 26 includes a mixture of salt water and a mild acid, such as vinegar. The electrolytic solution 26 allows the oxygen to be released at the anode and hydrogen to be released at the cathode. As the zinc oxidizes in the electrolytic solution 26, the mild acid breaks down the zinc oxide that is produced. The broken down zinc migrates to the cathode where the zinc is electro-plated to the surface of the cathode. The zinc coating on the anode gradually decreases as the zinc oxidizes and the zinc coating on the cathode gradually increases as the zinc is electro-plated onto the cathode.

The mild acid may be vinegar or sulphuric acid. Vinegar may be particularly desirable as it may be inexpensive, effective, and readily available. The mild acid facilitates the separation of oxide produced back into zinc and oxygen. The mild acid is mixed with a much larger portion (e.g., between 6:1 and 10:1) of salt water to form the electrolytic solution 26. The mild acid dissolves the zinc oxide, as the zinc oxide is produced, and releases oxygen onto the anode while the zinc is plated to the cathode. Without the mild acid and the separation of the zinc oxide there would be the creation of zinc oxide and the consumption of zinc.

In an embodiment, the electrolytic solution 26 is seeded with zinc. The zinc is seeded into the mild acid solution. In an embodiment, the electrolytic solution 26 is seeded with zinc by placing a sheet of zinc into the vinegar before the mild acid is added to the salt water. After the zinc has dispersed into the mild acid over a period of time (e.g., a few hours), the sheet of zinc is removed from the mild acid and the seeded mild acid solution is mixed with the salt water. The zinc seeding allows for faster transfer of plated zinc through the electrolytic solution 26.

In an embodiment, the electrolytic solution 26 is prepared and seeded once at the beginning of the process. The electrolytic solution 26 may contain about eight (8) parts of salt water to one (1) part of vinegar with zinc dissolved (seeded) into the mixture.

The zinc may be seeded into the electrolytic solution by dissolving zinc into undiluted vinegar for a period of time (e.g., 2 hours). The vinegar is then stirred into the salt water and a sheet of zinc is placed into the mixture for a period of time (e.g., 24 hours) in order to further seed the electrolyte. During production the water and vinegar are slowly consumed and are replenished in order to top up the level of the electrolyte and no further zinc is added.

The anode releases oxygen and zinc while the cathode releases hydrogen and attracts zinc. The acid breaks apart the zinc oxide while the oxidization enables less current use than regular electrolysis, in order to separate the water molecules into hydrogen and oxygen. Oxidization of the zinc allows for the production of hydrogen from the salt water which may use less electrical current than prior art methods of electrolysis.

The anode may begin the process as thickly plated with zinc and the cathode begins as thinly plated with zinc.

Initially, the cathode may be thinly plated with zinc, with just enough of a coating so that the aluminum plate does not oxidize in the electrolytic solution 26. The anode is plated with zinc to a thickness dependent on a plating time and a desired run time. In some cases, the anode and cathode may be of equal zinc plating thickness, however, once the electrolysis begins, the cathode will acquire zinc from the anode.

As the electrolysis occurs, the zinc passes from the anode to the cathode. After a period of time, the charges on the electrodes 1, 2 are reversed (see FIG. 2), so that the first electrode 1 becomes a cathode and the second electrode 2 becomes an anode. When the current flow is reversed across the electrodes 1, 2, the zinc migrates in the opposite direction.

In an embodiment, the electrodes 1, 2 are made of 5000 series aluminum plates that are resistant to salt water deterioration. The aluminum plates are electro-plated with a layer of zinc, which provides corrosion resistance and electrical conductivity. In an embodiment, the aluminum plates are 5052 grade aluminum, which may be particularly resistant to corrosion in salt water.

Aluminum may be particularly advantageous as zinc electroplates to aluminum and aluminum is a good conductor of electricity. In other embodiments, the electrodes 1, 2 may be made from another material such as zinc plated metal such as copper, platinum, steel, stainless steel, a steel alloy, or another conductive material with corrosion resistance, electrical conductivity and the ability to be zinc plated.

The electrodes 1, 2 may be four-inch square plates having a thickness of approximately $1/32$ of an inch. In other embodiments, the electrodes 1, 2 may have different sizes and shapes.

In an embodiment, the thin plating of zinc is about $1/16$ of the thickness of the aluminum plate in the cathode. The thick plating of the zinc is about $1/4$ of the thickness of the aluminum plate of the anode.

For example, the aluminum plates of the electrodes 1, 2 may be $1/16$" in thickness. When aluminum plate of the cathode is $1/16$" thick, the thin coating of zinc is about $1/256$" thick. When aluminum plate of the anode is $1/16$" thick, the thick coating of the zinc is about $1/64$" thick up to a thickness of $1/32$". The thickness of the zinc coating is dependent on the length of the desired run time. The plating time may be about three times the desired run time. For example, if the desired run time is 1 hour, before switching current, then the anode is plated for 3 hours. Further, the anode should not be plated so thick as to flake off of the plate or to close the spacing to the cathode. The anode and cathode should not touch.

In a particular embodiment, shown in FIGS. 1 and 2, the apparatus 3 includes four pairs of electrodes 1, 2, four anodes and four cathodes. The anodes and cathodes are arranged in alternating sequence such that each cathode is spaced apart from an adjacent anode (e.g. one cathode followed by one anode). In other embodiments, there may be a different number of electrodes 1, 2, for example, at least one anode and at least one cathode.

In an embodiment, the apparatus 3 includes a tapper 43 (shown schematically) for tapping the electrodes 1, 2 to disperse gas bubbles, at the end of each cycle before the electrical current is switched.

During a run phase, the current is applied across the electrodes 1, 2, and hydrogen forms on the cathode while the zinc coating on the cathode increases in thickness. Hydrogen is released at the cathode and oxygen is released at the anode. Once the zinc coating on the anode becomes thin, the electrical current across the anode and cathode is reversed so that the now thickly coated cathode becomes an anode while the thinly coated anode becomes the cathode. The current is applied across the anode and cathode so that the initial arrangement is reversed and one plate is thinly coated and the other plate is thickly coated.

The apparatus 3 includes the controller 36 for controlling the electrical current and voltage being supplied by the power supply 29. The controller 36 includes a regulator 28 for regulating the amount of electrical voltage and current supplied as the amount of current changes continuously while the anodes and cathodes sacrifice and accumulate zinc, respectively. The current varies based on the thicknesses of the zinc and the electrolytic solution 26.

The controller 36 may also include a sensor 38 for sensing the electrical current across the electrodes 1, 2. The sensor 38 detects the amount of current flow as the zinc travels in the electrolytic solution 26. The regulator 28 regulates the electrical current based on the sensed electrical voltage and current to keep the electrical current in a preferred range. For example, where there is a voltage drop, the sensor 38 detects the voltage drop and the regulator 28 increases the voltage. The preferred voltage range is based on the size and the scale of the apparatus 3.

The apparatus 3 may also include a pump 40 for circulating the electrolytic salutation. The pump 40 may also circulate added salt water and mild acid as the salt water is consumed. The pump 40 may also prevent bubbles of oxygen and hydrogen from forming on the electrodes 1, 2.

The controller 36 may include a switch 37 for periodically reversing the direction of electrical current flow. In certain cases, the switch 37 automatically reverses the direction of the current flow based on time and/or thickness of the electrodes 1, 2. The controller 36 may include a timer 39 for determining a run time set to trigger the switch 37 to reverse the direction of the electrical current flow. The run time may be based on the amount of zinc plated on the anode.

Referring now to FIG. 2, illustrated therein is the apparatus 3' after the electrical current has been reversed. The first electrode 1' is a cathode and the second electrode 2' is an anode. The first electrode 1' releases hydrogen and is electro-plated with zinc from the second electrode 2'. The second electrode 2' loses zinc and releases oxygen onto the surface of the second electrode 2'. The electrical current can be reversed continuously, consuming only the salt water and vinegar, with the zinc being electro-plated from the anode to the cathode. The heavier zinc deposit is located on the anode. The cathode is connected to the negative terminal of a direct current power supply 29, through the regulator 28, which indirectly connects the other cathodes to the power supply 29.

Referring again to FIG. 1, the plurality of second electrodes 2 are electrically interconnected to each other in parallel by second electrode couplers 8. For example, the second electrode couplers 8 may be push on clips that can be used to form a continuous link between the second electrodes 2. The push on clips include an appropriate gauge wire 9 having two female nylon clips at the ends of the wire 9 that slide over two respective second electrodes 2. The wire 9 is crimped inside the clips and is in electrical contact with each second electrode 2 so as to electrically interconnect the two second electrodes 2. In other embodiments, the second electrode couplers 8 may be connected to the second electrodes 2 in different ways, for example, by soldering the wires to the second electrodes 2.

The apparatus 3 includes a second electrode end connector 31 for electrically connecting the second electrodes 2 to the power supply 29. The second electrode end connector 31 includes a current supply wire 18, having an appropriate gauge, with a female nylon clip on one end of the wire, and a male disconnect at the other end of the wire. The female nylon clip can slide onto the second electrode 2 and the male disconnect can be connected to the power supply 29. In other embodiments, the second electrodes 2 may be connected to the power supply 29 in different ways, for example, using other types of end connectors.

The plurality of first electrodes 1 are electrically interconnected to each other in parallel by first electrode couplers 7. For example, the first electrode couplers 7 may be push on couplers that can be used to form a continuous link between the first electrodes 1. The first electrode couplers 7 are generally similar to the second electrode couplers 8 and include an appropriate gauge wire with two female nylon clips. In other embodiments, the first electrode couplers 7 may be connected to the first electrodes 1 in different ways, for example, by soldering the wires to the first electrodes 1.

One of the first electrodes 1 is connected to a positive terminal of the direct current power supply 29, through the regulator 28, which indirectly connects the remaining first electrodes 1 to the direct current power supply 29. The apparatus 3 includes a first electrode end connector 32 for electrically connecting the first electrodes 1 to the power supply 29. For example, the first electrode end connector 32 may be generally similar to the second electrode end connector 31 and may include a current supply wire 19, having an appropriate gauge, with a female nylon clip and a male disconnect. In other embodiments, the first electrodes 1 may be connected to the power supply 29 in different ways, for example, using other types of end connectors.

The apparatus 3 also includes non-conductive spacers 42 coupled to the electrodes 1, 2 for spacing apart the electrodes 1, 2 in an electrically insulated manner. For example, the non-conductive spacers 42 may include insulating bolts 4, insulating nuts 5 and insulating washers 6 for fastening the electrodes 1, 2 together within the stack. The non-conductive spacers 42 electrically insulate the electrodes 1, 2 from each other during electrolysis, while also positioning the electrodes 1, 2 within the stack.

The non-conductive spacers 42 may removably couple the electrodes 1, 2, for example, such that the electrodes 1, 2 can be replaced. For example, the insulating nuts 5 may be unthreaded from the insulating bolts 4 such that the electrodes 1, 2, and the insulating washers 6 can be removed and then replaced.

Referring now to FIGS. 3 and 4, illustrated therein is an electrode (such as the first electrode 1) used in the electrolysis apparatus 3. In particular, FIG. 3 is the first electrode 1 operating as an anode and FIG. 4 is the first electrode 1' operating as a cathode. In FIG. 3, the first electrode 1 starts off connected to the positive terminal, and loses its zinc coating while producing oxygen. In FIG. 4, the first electrode 1, as a cathode, is thinly zinc coated, negatively charged, and produces hydrogen.

The apparatus 3 includes collectors 25 (or collection hoods) positioned above the electrodes 1, 2 for collecting the produced oxygen and hydrogen gases. During electrolysis, hydrogen bubbles form around the cathodes while oxygen bubbles form around the anodes. Each collector 25 is positioned to alternatively collect hydrogen from the anode or oxygen from the cathode, dependent on the charge of the electrode 1. The oxygen and hydrogen gases rise from the electrodes 1, 2 and are collected from above by the collectors 25. The collectors 25 connect to a hydrogen tube 16 at one end and an oxygen tube 15 at an opposite other end. The hydrogen tube 16 directs collected hydrogen to a hydrogen storage tank. The oxygen tube 15 directs collected oxygen to an oxygen storage tank.

The collectors 25 includes a hydrogen flap valve 33 for selectively opening and closing the hydrogen tube 16 and an oxygen flap valve 34 for selectively opening and closing the oxygen tube 15. Based on the particular gas being collected, the flap valves 33, 34 open and close to provide flow to the hydrogen and oxygen tubes 15, 16 which pass to the hydrogen and oxygen storage tanks.

To direct gasses, the collector 25 is selectively angled at an angle 41 such that the hydrogen gas or oxygen gas will rise to the highest point in the collector 25 and the appropriate tube 15, 16. For example, the angle 41 is between 1 and 10 degrees.

When the collector 25 is up over the anode (FIG. 3), the collector 25 is also up on the same side over the cathodes adjacent to them. The gas rises in the collectors 25 with the oxygen produced at the anode collected by tubes 15 (O2) and the hydrogen produced at the cathode collected in other tubes 16 (H2) and directed to separate storage tanks. Once the cycle is finished the current is reversed so that the plates that were the anodes, now become the cathodes and the former cathodes now the anodes. When the current is reversed, so that the former anode becomes the cathode, the collector 25 is tilted upwards on the opposite end. The tube 16 over the new cathode plate, on the other end of the collector hood collects hydrogen (H2) and the hydrogen is now collected at the high end of the collector 25 which is now tilted in a different direction. The adjacent collector 25 over the new anode plate then also directs oxygen upwards to the open flap valve and out through the tube 15 on the high end of the collector 25.

The collector 25 includes a pivot hole 35 that pivots the collector 25 at angle 41 based on the direction of the electrical current to direct hydrogen or oxygen to the flap valves 33, 34. As the collector 25 pivots, one flap valve 33 closes and the other flap valve opens 34. The collector 25 may pivot mechanically and automatically when the electrical current is reversed.

Figure 5:
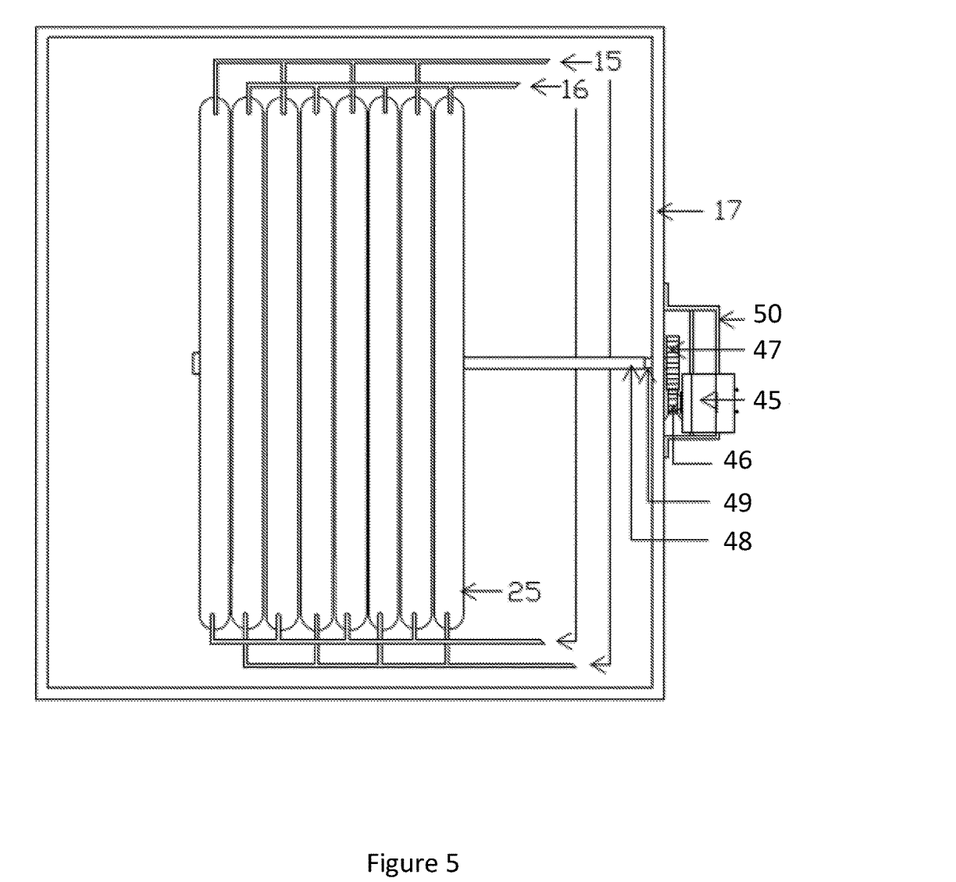
FIG. 5 is a top view of a collector for the apparatus of FIG. 1.

Referring now to FIG. 5, illustrated therein are the collectors 25. The angle 41 of the collector 25 is controlled by a direct current motor 45, a small gear 46, a large gear 47 and a square rod 48. The square rod 48 passes through the pivot hole 35 in the collector 25 and adjusts the collector 25 to the proper angle 41 during the gas production process. The end of the square plastic rod 48 is rounded at a first end 49 in order to pass through a sealed bearing in the side of the tank 17 and then enabling the rod 48 to attach to the large gear 47. When it is time to reverse the current flow in the electrodes 1, 2, the motor 45 receives current from the regulator 28 that enables the collector 25 to adjust the angle in order to collect the gases that will then be produced.

The square rod 48 adjusts angle 41 of the collector 25. The square rod 48 is rounded at the end 49 to pass through a sealed bearing in the wall of the tank 17 and then connects via the large gear 47 and the small gear 46 to the direct current motor 45. The motor 45 is held in place by a bracket 50 on the side wall of the tank 17 and is activated in one of two directions by current flowing through the voltage regulator 28 from the power supply 29. The voltage regulator 28 controls the direction and the duration of the electrical current in order to properly adjust the angle 41 of the collector 25.

When the first electrode 1 is the anode and hydrogen is produced (FIG. 3), the hydrogen flap valve 33 is open for the hydrogen tube 16 and the oxygen flap valve 34 is closed for the oxygen tube 15. Similarly, when the first electrode 1' is the cathode and oxygen is produced (FIG. 4), the oxygen flap valve 34 is open for the oxygen tube 15 and the hydrogen flap valve 33 is closed for the hydrogen tube 16.

The chemical reactions that produce both the hydrogen and oxygen may occur on the surface of the electrodes 1, 2.

It may be desirable to increase the surface area of the electrodes 1, 2 so as to increase the amount of gases that are produced. Accordingly, the electrodes 1, 2 may include a multiplicity of apertures 27 for increasing the surface area of the electrodes 1, 2.

In some embodiments, the apertures 27 may have a diameter of approximately 1/16 of an inch and a density of approximately 64 apertures per square inch. The apertures 27 may be distributed in a pattern so as to provide a perforated electrodes 1, 2. While the apertures 27 of the illustrated embodiment are circular, the apertures 27 may be other shapes such as square or oval. The zinc plating on the electrodes 1, 2 is such that the apertures 27 continue to be present.

The electrodes 1, 2 include four bolt holes 21 for receiving four of the insulating bolts 4. The insulating bolts 4 may be made of an insulating material such as plastic. The insulating bolts 4 cooperate with the insulating nuts 5 and insulating washers 6 to couple the electrodes 1, 2 together in an electrode stack while electrically insulating oppositely charged electrodes 1, 2. In other embodiments, there may be a different number of bolt holes 21 depending on the desired number of insulating bolts 4.

The second electrode couplers 8 electrically interconnect the set of second electrodes 2 and the first electrode couplers 7 electrically interconnect the set of first electrodes 1. To facilitate the use of couplers 7, 8, each electrode 1, 2 may have tabs 20 cut into the side of the plate for receiving the couplers 7, 8.

The first electrode 1 may have two tabs 20 on the one side for receiving two different first electrode couplers 7. In particular, one tab 20 may receive the female nylon clip of the first electrode coupler 7 that is coupled to another similarly charged electrode 1, and the other tab 20 may receive the female nylon clip of a different first electrode coupler 7 that is coupled to a further similarly charged electrode 1.

Similarly, the second electrode 2 has two tabs 20 on the opposite side to that of the first electrodes 1. Positioning the tabs 20 of the second electrode 2 on the opposite side as the tabs 20 of the first electrode 1 may reduce interference between the second electrode couplers 8 and the first electrode couplers 7.

The set of second electrodes 2 are connected in parallel to the terminal of the direct current power supply 29 through the regulator 28. In particular, the second electrode 2 closest to the nut end (e.g. the left side of FIG. 1) is connected to the power supply 29 using the second electrode end connector 31. The second electrode end connector 31 includes the current supply wire 18 having a female nylon clip on one end and a male disconnect on the other end. The female nylon clip slides over one of the tabs 20 on the second electrode 2. The male disconnect can be connected to the direct current power supply 29 through a corresponding female connector 11 on a wire 13 connected to the terminal of the direct current power supply 29.

Similarly, the set of first electrodes 1 are connected in parallel to the opposite terminal of the direct current power supply 29. In particular, the first electrode 1 closest to the nut end (e.g. the left side of FIG. 1) is connected to the power supply 29 using the first electrode end connector 32. The first electrode end connector 32 includes a current supply wire 19 having a female nylon clip on one end and a male disconnect on the other end. The female nylon clip slides over one of the tabs 20 on the first electrode 1. The male disconnect can be connected to the direct current power supply 29 through corresponding a opposite female connector 10 on a wire 12 connected to the opposite terminal of the direct current power supply 29.

Tests were conducted using the electrode stack illustrated in FIGS. 1 and 2, including a set of four zinc coated perforated aluminum first electrodes 1 and a set of four oppositely charged zinc coated perforated aluminum electrodes 2. The electrodes 1, 2 being four inches square (10.16 cm) and has a thickness of approximately 1/32 of an inch (0.792 mm).

It has been determined that supplying approximately one volt of electrical potential across the electrodes 1, 2 in the stack at approximately one amp (e.g. approximately one watt of power) may provide an efficient means for producing hydrogen. For example, the apparatus 3 produced approximately 400 milliliters of hydrogen gas every hour using 1 watt of electricity.

Based on this data, it may be desirable to configure the power supply 29 and regulator 28 to provide between approximately 0.8 and 1.2 volts of electrical potential and between approximately 0.8 and 1.2 amperes, in order to maximize the hydrogen gas produced per watt of power supplied.

In some embodiments, there may be a plurality of electrode stacks supplied with approximately 0.8 and 1.2 volts and between approximately 0.8 and 1.2 amperes. Providing a plurality of electrode stacks may increase the amount of hydrogen produced by this process.

In some embodiments, there may be a different number of electrodes 1, 2 in the electrode stack and the amount of power applied to each electrode stack may be different. Accordingly, in some embodiments, the power supply 29 may be configured to supply between approximately 0.8 and 1.2 volts and an amperage based on the number of electrodes 1, 2 in the electrode stack. For example, the amperage may be between approximately 0.1 and 0.4 amperes for each second electrode 2 and each first electrode 1.

While the illustrated embodiment of FIGS. 1 to 4 includes electrodes 1, 2 having a particular size, shape and surface area (e.g. approximately sixteen square-inches, not accounting for the plate thickness, apertures 27 and bolt holes 21), other embodiments may include electrodes 1, 2 having a different size, shape and surface area.

In some embodiments, each plate may have a different size, shape, or surface area, and the amount of power applied to each electrode 1, 2 may be different. Accordingly, in some embodiments, the power supply 29 may be configured to supply between approximately 0.8 and 1.2 volts and a current density based on the number of the plates in the stack and the size, shape and surface area of each plate. For example, the current density may be between approximately 0.003 and 0.03 amperes per square-inch for each electrode 1, 2.

Figure 6:
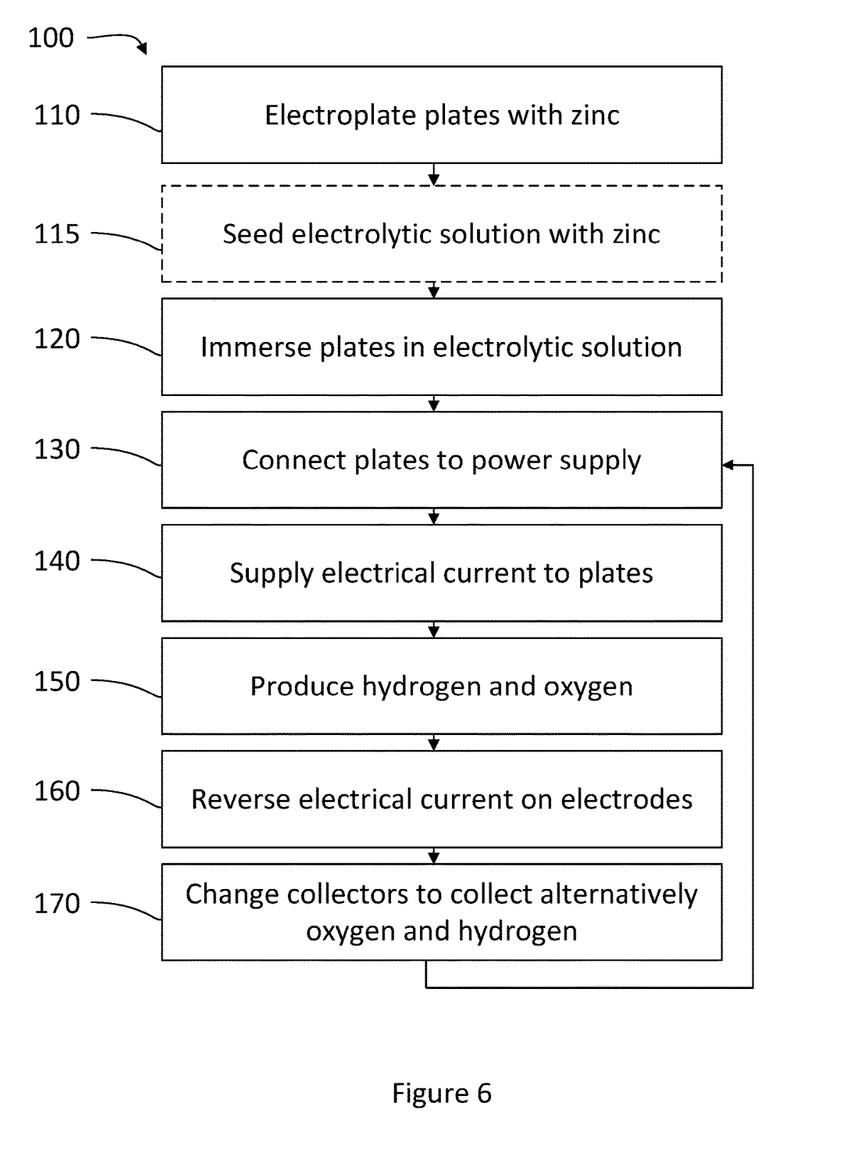
FIG. 6 is a flow chart of a method for producing hydrogen, in accordance with an embodiment.

Referring now to FIG. 6, illustrated therein is a method 100 of salt water electrolysis, in accordance with an embodiment. The method 100 is for producing hydrogen and oxygen from salt water electrolysis in an electrolyte of salt water and vinegar, and may use the apparatus 3 as described with reference to FIGS. 1 to 4.

At 110, a heavy zinc coating is electroplated onto half of the electrode plates and a thin zinc coating is applied onto the other half of the electrode plates used in the electrode stack to create cathode plates (e.g., second electrodes 2 of FIG. 1) and anode plates (e.g., first electrodes 1 of FIG. 1). During a set up phase, one or more aluminum plates are thickly plated with zinc to create the anode, and one or more aluminum plates are thinly plated with zinc to create the cathode. The anode is thickly plated with zinc such that the thickness of the zinc plating is dependent on a desired run time. The cathode is thinly plated with zinc such the thin plating of zinc is about 1/16 of the thickness of the cathode plate.

The zinc plating prevents the aluminum from oxidizing. The anode is electroplated with zinc for approximately three (3) times as long as the desired run time. For example, if the desired run time is 8 hours, the anode is plated for 24 hours.

At 115, optionally, the electrolytic solution is seeded with zinc.

At 120, a stack of zinc coated plates is immersed into an electrolytic solution including salt water and mild acid such as vinegar. The electrode stack includes at least one zinc plated anode and at least one zinc plated cathode spaced apart from the anode. The anode plate is the heavily zinc coated plate and the cathode plate is the lightly zinc coated plate.

At 130, the anode plate is connected to the positive terminal of a direct current power supply and the cathode plate is connected to the negative terminal of the same power supply.

At 140, direct electrical current is supplied across the zinc plated anode and the zinc plated cathode. The cathode and anode may be provided between approximately 0.8 and 1.2 volts and between approximately 0.8 and 1.2 amperes when using the apparatus 3 described above.

At 150, hydrogen gas is produced at the cathode and is collected. Oxygen gas is produced at the anode and is collected. The gases are collected by adjusting the angle of the collector to the desired output.

The zinc coating on the aluminum anode plates gradually becomes thinner while the zinc coating on the perforated aluminum cathode plates becomes thicker. The water and the vinegar are consumed during this process, and are replenished in the electrolytic solution in order to keep the concentration and depth of the electrolytic solution at optimum operational levels.

At 160, the direction of the electrical current is reversed once the zinc coating on the anode plate has become quite thin. The power supply is turned off and the anodes are switched by connecting the anodes to the negative terminal of the direct current power supply and the former cathodes are connected to the positive terminal making the plate function as the anode plate of the apparatus 3.

At 170, the angle of the collector is switched so that the hydrogen and oxygen are properly directed to their separate collection tubes and storage tanks. After the zinc coating on the anode plate becomes thin then the cycle is resumed by disconnecting the power and proceeding to 130 in order to continuously produce hydrogen and oxygen while accommodating the migration of the zinc from the anode plate to the cathode plate.

In some embodiments the method 100 may be used with an apparatus having plates with different sizes and shapes than those described and illustrated herein.

While the above description provides examples of one or more apparatus, methods, or systems, it will be appreciated that other apparatus, methods, or systems may be within the scope of the claims as interpreted by one of skill in the art.

The invention claimed is:

1. An apparatus for producing hydrogen from salt water by electrolysis, the apparatus comprising:
at least one pair of electrodes, wherein the pair of electrodes comprises a first zinc plated electrode and a second zinc plated electrode spaced apart from the first zinc plated electrode;
a controller for supplying direct electrical current across the first and second electrodes such that the first and second electrodes are oppositely charged; and
a tank containing an electrolytic solution including salt water and a mild acid;
wherein the first and second electrodes are immersed in the electrolytic solution.

2. The apparatus of claim 1, the controller includes a switch for reversing the direction of electrical current flow supplied across the first and second electrodes such that the first electrode switches from being an anode to being a cathode and the second electrode switches from being a cathode to being an anode.

3. The apparatus of claim 1, wherein the first electrode and the second electrode each comprise an aluminum plate.

4. The apparatus of claim 3, wherein the second electrode is thinly plated with zinc such that the aluminum plate does not oxidize in the electrolytic solution.

5. The apparatus of claim 4, wherein the thin plating of zinc is about 1/16 of the thickness of the aluminum plate of the second electrode.

6. The apparatus of claim 4, wherein the first electrode is thickly plated with zinc such that the thickness of the zinc plating is dependent on a desired run time.

7. The apparatus of claim 6, wherein a plating time is about three times the desired run time.

8. The apparatus of claim 6, wherein the thick plating of the zinc is about 1/4 of the thickness of the aluminum plate of the first electrode.

9. The apparatus of claim 1, wherein the mild acid is vinegar.

10. The apparatus of claim 1, wherein the electrolytic solution is seeded with zinc.

11. The apparatus of claim 1, wherein the first and second electrodes include any one of aluminum alloy, copper, or steel.

12. The apparatus of claim 1 further comprising a collector positioned to collect hydrogen from the first electrode or oxygen from the second electrode, dependent on the direction of the electrical current.

13. The apparatus of claim 12, wherein the collector includes flap valves for selectively collecting hydrogen or oxygen.

14. The apparatus of claim 13, wherein the collector includes a pivot that pivots based on the direction of the electrical current to direct hydrogen or oxygen upwards towards the open flap valve.

15. The apparatus of claim 1, wherein the controller includes a regulator for regulating the amount of electrical voltage and current supplied across the first and second electrodes.

16. The apparatus of claim 15, wherein the controller includes a sensor for monitoring the electrical current, and wherein the regulator regulates the electrical current based on the sensed electrical current.

17. The apparatus of claim 6, wherein the controller reverses the direction of the electrical current flow after the desired run time.

18. The apparatus of claim 1, wherein each pair of electrodes comprises one thickly zinc coated anode and one thinly zinc coated cathode.

19. A method of producing hydrogen from salt water by electrolysis, the method comprising:
immersing at least one pair of electrodes in an electrolytic solution including salt water and a mild acid, wherein the pair of electrodes comprises a first zinc plated electrode and a second zinc plated electrode spaced apart from the first zinc plated electrode;

supplying direct electrical current across the first and second electrodes such that the first and second electrodes are oppositely charged;

collecting the hydrogen gas produced at the second electrode;

collecting the oxygen gas produced at the first electrode; and reversing the direction of the electrical current supplied across the first and second electrodes.

20. The method of claim 19 further comprising thickly plating the first electrode with zinc such that the thickness of the zinc plating is dependent on a desired run time.

21. The method of claim 19 further comprising thinly plating the second electrode with zinc such the thin plating of zinc is about 1/16 of the thickness of the second electrode.

22. The method of claim 19 further comprising seeding the electrolytic solution with zinc.

23. The method of claim 22 further comprising regulating the amount of electrical voltage and current supplied across the first and second electrodes.

24. The method of claim 23 further comprising sensing the electrical current, and wherein regulating the electrical current based on the sensed electrical current.

25. The method of claim 23 further comprising reversing the direction of the electrical current supplied across the first and second electrodes after the desired run time, wherein the run time is based on the amount of zinc plated on the first electrode.

* * * * *